(12) United States Patent
Jeong et al.

(10) Patent No.: US 8,136,022 B2
(45) Date of Patent: Mar. 13, 2012

(54) DETECTOR FOR MULTI-LEVEL MODULATED SIGNAL AND DETECTION METHOD USING THE SAME, AND ITERATIVE RECEIVER FOR MULTI-LEVEL MODULATED SIGNAL AND ITERATIVELY RECEIVING METHOD USING THE SAME

(75) Inventors: Byung-Jang Jeong, Daejeon (KR); Jae Young Ahn, Daejeon (KR); Jinho Choi, Swansea (GB)

(73) Assignee: Electronics and Telecommunications Research Institute, Daejeon (KR)

( * ) Notice: Subject to any disclaimer, the term of this patent is extended or adjusted under 35 U.S.C. 154(b) by 1155 days.

(21) Appl. No.: 11/920,226

(22) PCT Filed: May 12, 2006

(86) PCT No.: PCT/KR2006/001767
§ 371 (c)(1),
(2), (4) Date: Nov. 13, 2007

(87) PCT Pub. No.: WO2006/121296
PCT Pub. Date: Nov. 16, 2006

(65) Prior Publication Data
US 2011/0087951 A1    Apr. 14, 2011

(30) Foreign Application Priority Data
May 12, 2005    (KR) .................. 10-2005-0039897
Apr. 25, 2006    (KR) .................. 10-2006-0037215

(51) Int. Cl.
*H03M 13/03*    (2006.01)
(52) U.S. Cl. ........ 714/794; 714/780; 714/795; 714/796; 365/262; 365/341

(58) Field of Classification Search .................. 714/780, 714/794–796
See application file for complete search history.

(56) References Cited

U.S. PATENT DOCUMENTS

| | | | |
|---|---|---|---|
| 5,621,764 A * | 4/1997 | Ushirokawa et al. | 375/317 |
| 6,084,926 A * | 7/2000 | Zak et al. | 375/341 |
| 6,980,602 B1 * | 12/2005 | Kleinerman et al. | 375/262 |
| 7,154,936 B2 * | 12/2006 | Bjerke et al. | 375/148 |
| 7,180,968 B2 * | 2/2007 | Miyauchi et al. | 375/341 |
| 7,272,771 B2 * | 9/2007 | Nieminen | 714/755 |
| 7,336,733 B2 * | 2/2008 | Naito | 375/340 |
| 7,372,896 B2 * | 5/2008 | Bjerke et al. | 375/148 |
| 7,397,864 B2 * | 7/2008 | Tarokh et al. | 375/299 |
| 2003/0095610 A1 | 5/2003 | Liang et al. | |

FOREIGN PATENT DOCUMENTS
EP    1298814    4/2003

* cited by examiner

*Primary Examiner* — Esaw Abraham
(74) *Attorney, Agent, or Firm* — Staas & Halsey LLP

(57) ABSTRACT

Provided are a detector for a multi-level modulated signal and a detection method using the same, and an iterative receiver for a multi-level modulated signal and an iteratively receiving method using the same. The detector includes: a channel estimator estimating a channel response of each of a plurality of bits included in at least one received signal based on multi-level modulation; a hard decision unit, for each bit, selecting at least one of a plurality of bits remaining by excluding the bit and performing a hard decision based on a pre-probability of the selected bit; and a reliability calculator calculating reliability of each of all the bits in the received signal based on the received signal from which the hard-decided bit component is cancelled and the estimated channel response. Accordingly, the computation amount according to detection can be reduced without the degradation of performance.

13 Claims, 3 Drawing Sheets

DETECTOR FOR MULTI-LEVEL MODULATED SIGNAL AND DETECTION METHOD USING THE SAME, AND ITERATIVE RECEIVER FOR MULTI-LEVEL MODULATED SIGNAL AND ITERATIVELY RECEIVING METHOD USING THE SAME

CROSS REFERENCE TO RELATED APPLICATIONS

This application claims the benefit under 35 U.S.C. Section 371, of PCT International Application Number PCT/KR2006/001767 filed May 12, 2006 and Korean Application Nos. 10-2005-0039897 and 10-2006-0037215 filed May 12, 2005 and Apr. 25, 2006 respectively, in Republic of Korea, the contents of which are incorporated herein by reference.

FIELD OF THE INVENTION

The present invention relates to a detector and an iterative receiver, and more particularly, to a detector for a multi-level modulated signal and a detection method using the same, and an iterative receiver for a multi-level modulated signal and an iteratively receiving method using the same.

DESCRIPTION OF THE RELATED ART

Recently, iterative receivers have been intensively studied. In particular, since optimum receivers are too complex to be implemented in systems using multi-antennas, iterative receivers, which have relatively low complexity and perform close to the level of the optimum receivers, have been widely researched.

Such an iterative receiver has been studied in a bit-interleaved coded modulation (BICM) system. The BICM system has an advantage that a transmission rate close to channel capacity can be obtained using a relatively simple transmitter. However, good performance can be expected only if signals transmitted from all antennas are simultaneously detected. The limitation of the BICM are also applied to the iterative receiver. In particular, in high-order modulation, the amount of computation for the detection is too large to be ignored. To address this problem, a method of using a linear filter and interference cancellation together (A. Stefanov and T. M. Duman, "Turbo-coded modulation for systems with transmit and receive antenna diversity over block fading channel: system model, decoding approach, and practical consideration," *IEEE J. Select. Areas Comm.*, vol. 19, pp. 95-968, May 2001), a method of using square demodulation (B. M. Hochwald and S. ten Brink, "Achieving near-capacity on a multiple-antenna channel," *IEEE Trans. Comm.*, vol. 51, pp. 389-399, March 2003), and others have been suggested. However, although the method of using a linear filter and interference cancellation together has an advantage in terms of the amount of computation required, performance of the iterative receiver is degraded, and in the method of using square demodulation, the amount of computation is large.

SUMMARY OF THE INVENTION

The present invention provides a detector and an iterative receiver for a multi-level modulated signal using a small amount of computation without the degradation of performance by selectively performing a hard decision and a soft decision in a binary domain in a single antenna or multi-antenna wireless communication system.

According to an aspect of the present invention, there is provided a detector for a multi-level modulated signal, the detector comprising: a channel estimator estimating a channel response of each of a plurality of bits included in at least one received signal based on multi-level modulation; a hard decision unit, for each bit, selecting at least one of a plurality of bits remaining by excluding the bit and performing a hard decision based on a pre-probability of the selected bit; and a reliability calculator calculating reliability of each of all the bits in the received signal based on the received signal from which the hard-decided bit component is cancelled and the estimated channel response.

According to another aspect of the present invention, there is provided an iterative receiver for a multi-level modulated signal, the iterative receiver comprising: a channel estimator estimating a channel response of each of a plurality of bits included in at least one received signal based on multi-level modulation; a hard decision unit, for each bit, selecting at least one of a plurality of bits remaining by excluding the bit and performing a hard decision based on a pre-probability of the selected bit; a reliability calculator calculating reliability of each of all the bits in the received signal based on the received signal from which the hard-decided bit component is cancelled and the estimated channel response; and a channel decoder performing channel decoding based on the calculated reliability and generating soft decision information of each of the bits, wherein the hard decision unit uses the soft decision information as information on the pre-probability.

According to another aspect of the present invention, there is provided a detection method for a multi-level modulated signal, the detection method comprising: estimating a channel response of each of a plurality of bits included in at least one received signal based on multi-level modulation; for each bit, selecting at least one of a plurality of bits remaining by excluding the bit and performing a hard decision based on a pre-probability of the selected bit; and calculating reliability of each of all the bits in the received signal based on the received signal from which the hard-decided bit component is cancelled and the estimated channel response.

According to another aspect of the present invention, there is provided an iteratively receiving method for a multi-level modulated signal, the iteratively receiving method comprising: estimating a channel response of each of a plurality of bits included in at least one received signal based on multi-level modulation; for each bit, selecting at least one of a plurality of bits remaining by excluding the bit and performing a hard decision based on a pre-probability of the selected bit; calculating reliability of each of all the bits in the received signal based on the received signal from which the hard-decided bit component is cancelled and the estimated channel response; and performing channel decoding based on the calculated reliability and generating soft decision information of each of the bits, wherein in the selecting, the soft decision information is used as information on the pre-probability.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention relates to a detector having excellent performance using a small amount of computation in a multi-antenna wireless communication system using an iterative receiver, the iterative receiver, and a method using the same. In general, the computation amount of the iterative receiver performing simultaneous detection increases exponentially according to a modulation level and the number of antennas. Thus, when a conventional iteratively receiving method is used, a very large amount of computation is required, and in particular, when a high-order modulation method is used, the computation amount is too large to be ignored. This is because the number of occasions of bits composing a symbol to which the high-order modulation method is applied increases exponentially. According to an embodiment of the present invention, the computation amount is reduced by presenting a single symbol in a bit unit and performing simultaneous detection by selectively applying a hard decision and a soft decision to bits of the symbol according to reliability of each of the bits, and interference cancellation is performed minutely, i.e., in a bit unit not a symbol unit. Thus, the above-described problem can be solved.

That is, according to an embodiment of the present invention, there is provided a method of, in particular, reducing complexity of an iterative receiver and improving the performance of the iterative receiver using an iteratively receiving structure using a bit unit interference cancellation method. The iterative receiver increases the performance by iteratively performing detection and channel decoding. The reliability of a decoded signal is fed back and used for interference cancellation in the detection. In the present invention, by referring to reliability of each of a plurality of bits of the decoded signal, an interference component of bits having high reliability is cancelled using the hard decision, and an interference component of bits having low reliability is cancelled using the soft decision. In general, a method using the soft decision has higher performance. However, in the present invention, since the hard decision is selectively applied to only the bits having high reliability, the computation amount of detection can be reduced without the degradation of performance. In particular, the present invention is more effective for cases of using a high-order modulation method over 16-quadrature amplitude modulation (16-QAM) requiring a large computation amount or multi-antenna communication systems. In addition, according to an embodiment of the present invention, since minute interference cancellation can be performed compared to a conventional symbol unit interference cancellation method, better performance can be obtained.

Figure 1:
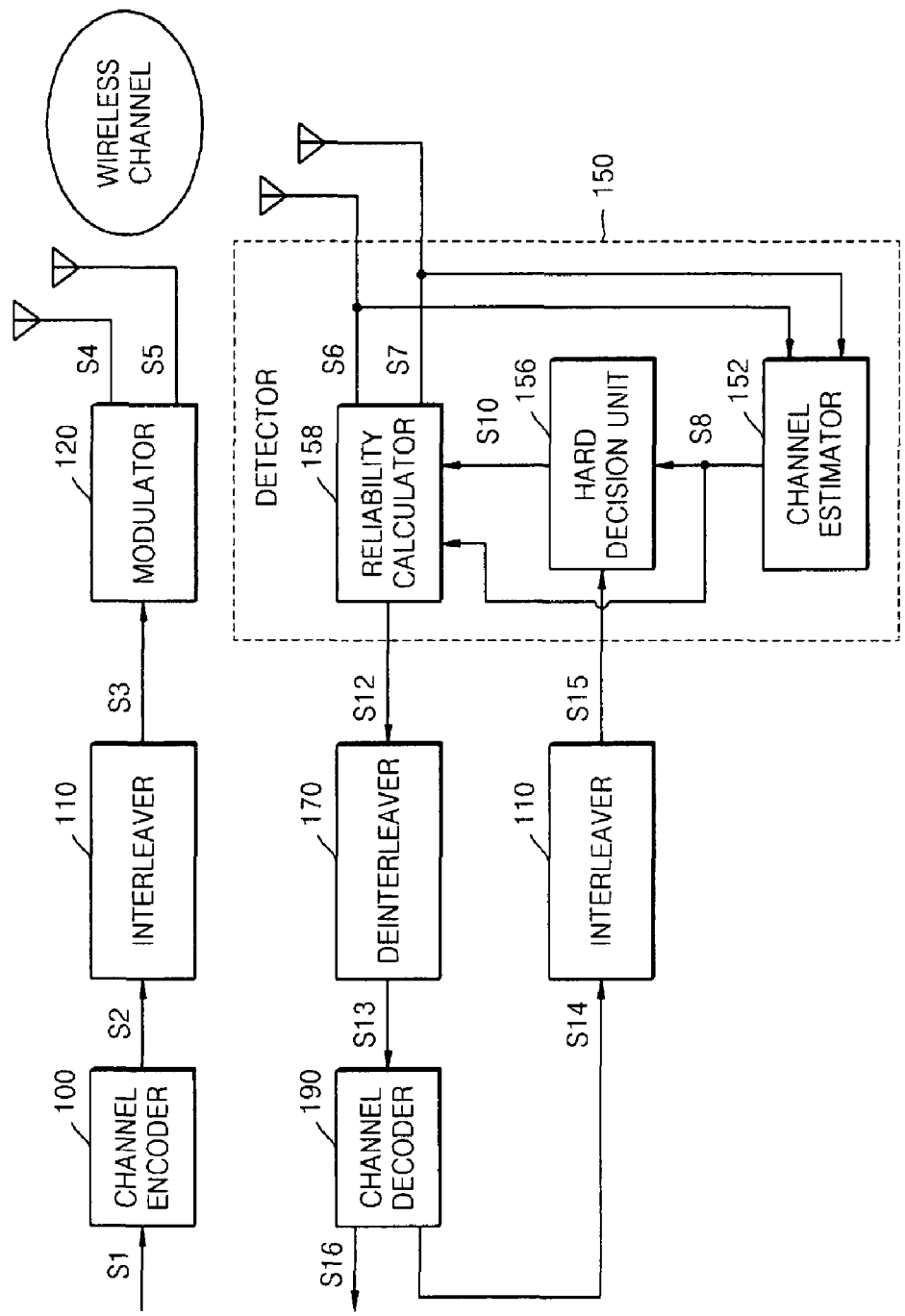
FIG. 1 is a block diagram of a transmitter and a receiver of a wireless communication system according to an embodiment of the present invention.

FIG. 1 is a block diagram of a transmitter and a receiver of a wireless communication system according to an embodiment of the present invention. Referring to FIG. 1, the transmitter of the wireless communication system includes a channel encoder 100, an interleaver 110, and a modulator 120, and the receiver includes a detector 150, a deinterleaver 170, an interleaver 180, and a channel decoder 190.

Although FIG. 1 illustrates a multiple input multiple output (MIMO) system including two transmitting antennas and two receiving antennas for convenience of description, the present invention can also be applied to single input single output (SISO) systems.

The transmitter will now be described first.

The channel encoder 100 performs channel encoding of input data S1 to generate channel-encoded bits S2. Examples of a channel encoding method are a convolutional coding method and a low density parity coding (LDPC) method. However, the channel encoding method is not limited thereto.

The interleaver 110 interleaves the channel-encoded bits S2 to be robust against fading, generating interleaved bits S3.

The modulator 120 multi-level modulates the interleaved bits S3, generating multi-level modulated signals S4 and S5. A multi-level modulated signal according to an embodiment of the present invention indicates a modulated signal containing more than two bits and transmitted.

The multi-level modulated signals S4 and S5 are transmitted through wireless channels using the two transmit antennas, respectively.

When the number of transmit antennas is K, a vector of momentary transmit symbols, i.e., multi-level modulated signals, can be obtained by $s=[s_1\ s_2\ \ldots\ s_K]^T$. Here, $s_k$ denotes a transmit symbol transmitted using a $k^{th}$ transmit antenna, and the upper suffix letter T denotes the transpose of the vector. The transmit symbol $s_k$, can be presented in a bit level using Equation 1.

$$s_k = w^T c_k = [w_1\ w_2\ \ldots\ w_\beta][c_{k,1}\ c_{k,2}\ \ldots\ c_{k,\beta}]^T \qquad (1)$$

Here, $\beta$ denotes the number of bits contained in a transmit symbol, $c_{k,n}$ denotes an $n^{th}$ element of a vector $c_k$ presenting the transmit symbol $s_k$ in a binary value, and w denotes a weight vector. When a correlation between bit and symbol is naturally mapped, for the case of 16-QAM, the weight vector w is $[2\ 1\ 2j\ j]^T$.

Using Equation 1, the transmit symbol vector s can be obtained using Equation 2.

$$s = (I_K \otimes w^T) b \qquad (2)$$

Here, b denotes $[c_1^T c_2^T \ldots c_K^T]$, and $\otimes$ denotes Kronecker multiplication.

Using this bit level equation, a received signal vector y of a receiver having J receive antennas can be obtained using Equation 3.

$$y = Hs + n = H(I_K \otimes w^T) b + n = Ab + n \qquad (3)$$

Here, H denotes a matrix indicating a MIMO wireless channel response in a symbol domain, wherein the number of rows is J, and the number of columns is K, n denotes a noise signal vector, and the matrix A denotes a wireless channel response matrix presented in a binary domain.

By transforming a symbol domain equation to a binary domain equation, that is Equation 3, the following effect can be obtained. For example, in a case of 16-QAM, if decoding information of one bit is correct and decoding information of the remaining three bits is incorrect, detection of the remaining three bits can be performed by canceling a component according to the correct one bit from a received signal. That is, by selectively performing interference cancellation and detection in a bit unit, detection more efficient than a symbol unit detection method can be performed. In detail, when the number of transmit antennas is K=2, the number of receive antennas is J=2, and the 16-QAM modulation method is used, Equation 3 is presented as Equation 4.

$$y = \begin{bmatrix} y_1 \\ y_2 \end{bmatrix} = Hs + n = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (4)$$

In 16-QAM, since each symbol contains 4 bits, Equation 4 can be presented as Equation 5.

$$y = \begin{bmatrix} h_{11} & h_{12} \\ h_{21} & h_{22} \end{bmatrix} \begin{bmatrix} 2b_{1,1} + b_{1,2} + j2b_{1,3} + jb_{1,4} \\ 2b_{2,1} + b_{2,2} + j2b_{2,3} + jb_{2,4} \end{bmatrix} + \begin{bmatrix} n_1 \\ n_2 \end{bmatrix} \quad (5)$$

$$= \begin{bmatrix} h_{11} & h_{12} \\ h_{21} & h_{22} \end{bmatrix} \begin{bmatrix} 2 & 1 & j2 & j & 0 & 0 & 0 & 0 \\ 0 & 0 & 0 & 0 & 2 & 1 & j2 & j \end{bmatrix} +$$

$$\begin{bmatrix} \begin{bmatrix} b_{1,1} \\ b_{1,2} \\ b_{1,3} \\ b_{1,4} \end{bmatrix} \\ \begin{bmatrix} b_{2,1} \\ b_{2,2} \\ b_{2,3} \\ b_{2,4} \end{bmatrix} \end{bmatrix} + \begin{bmatrix} n_1 \\ n_2 \end{bmatrix}.$$

Thus, 8 bits must be detected from the received signal vector y. To do this with a relatively lower computation amount, the following cancellation scheme is used.

1) The detector 150 receives soft decision decoding information of M (=βK=8) bits from the channel decoder 190. The soft decision decoding information is a kind of post-probability information of the channel decoder 190. The detector 150 performs, for each of the M bits, a hard decision of $M_1$ ($0 \leq M_1 < M$) bits having high reliability among (M−1) bits remaining by excluding the bit using the soft decision decoding information.

2) The detector 150 calculates, for each of the M bits, reliability of the bit by canceling the hard-decided bit component from the received signal. As a method of calculating the reliability, a maximum likelihood method, a linear filtering method, or an interference cancellation method can be used. However, the method of calculating the reliability is not limited to any of these.

3) The calculated reliability information is provided to the channel decoder 190 to be used for channel decoding.

The channel decoder 190 finally outputs hard decision decoding information by iterating the above-described procedures a predetermined number of times.

The above-described method will now be described in detail with reference to FIG. 1.

After calculating pre-probability S9 using an output S15 of the interleaver 180, the detector 150 performs a hard decision of a predetermined number of bits using information on the pre-probability S9 in order to calculate reliability S12 of each bit. After canceling the hard-decided bit component from received signals S6 and S7, the detector 150 calculates the reliability S12. If the transmitter does not use the interleaver 110, the receiver does not have to include the deinterleaver 170 and the interleaver 180, and in this case, the detector 150 calculates the information on the pre-probability S9 using an output S14 of the channel decoder 190.

The deinterleaver 170 deinterleaves the calculated reliability S12 through an inverse process of the interleaver 110 of the transmitter. The channel decoder 190 performs channel decoding based on the deinterleaved reliability S13. The channel decoding result is soft decision information S14 and hard decision information S16. In general, the hard decision information S16 is output after iterating the detection and the channel decoding a predetermined number of times.

Referring to FIG. 1, the detector 150 includes a channel estimator 152, a hard decision unit 156, and a reliability calculator 158. It is assumed that the transmitter uses the 16-QAM method and two transmit antennas and the receiver uses two receive antennas. In this case, since 4-bit bit information is included in the received signals S6 and S7, i.e., $y_1$ and $y_2$, 8 bits constitute the received signals S6 and S7.

The channel estimator 152 calculates Ã by estimating a bit-based channel response matrix A of the 8 bits. An example of a method of calculating Ã will now be described. The channel estimator 152 estimates a channel response matrix H of the received signals S6 and S7, i.e., $y_1$ and $y_2$, using various channel estimation methods including a pilot signal based channel estimation method and then calculates Ã using the estimated channel response matrix Ĥ and Equation 3. That is, the channel estimator 152 calculates Ã using Ã=Ĥ($I_K \otimes w^T$).

The hard decision unit 156 calculates a hard decision vector S10 $\hat{b}_1^{(m)}$ (m=1, 2, ..., 8) of each bit using the output S15 of the interleaver 180 as pre-probability information. Here, $\hat{b}_1^{(m)}$ denotes a hard decision vector needed to calculate φ(m), which is the reliability S12 of an $m^{th}$ bit, i.e., $b_m$. The output S15 of the interleaver 180 is soft decision decoding information $L(b_1), \ldots, L(b_8)$, which is the output 814 of the channel decoder 190, of 8 bits to be currently detected and is generally obtained using Equation 6 but not limited to this.

$$L(b_m) = \log \frac{Pr(b_m = +1)}{Pr(b_m = -1)}, m = 1, 2, \ldots, 8 \quad (6)$$

A method of calculating $\hat{b}_1^{(m)}$ will now be described by assuming that M=8. The hard decision unit 156 selects $M_1$ bits ($M_1$=3) having high pre-reliability among the 7 bits remaining by excluding $b_m$, and performs a hard decision of the selected bits using Equation 7. Pre-reliability is differentiated from reliability, which is the output S12 of the reliability calculator 158, and denotes reliability calculated by the hard decision unit 156 based on the pre-reliability information.

$$\hat{b}_k = \begin{cases} +1, & \text{if } Pr(b_k = 1) \geq Pr(b_k = -1) \\ -1, & \text{if } Pr(b_k = 1) < Pr(b_k = -1) \end{cases} \quad (7)$$

Here, k denotes an index of the selected bit.

A method of selecting $M_1$, bits having high pre-reliability will now be described. Examples of a method of determining a value of $M_1$, which is the number of bits to be hard-decided, are a method of determining the $M_1$ value as a previously fixed value and a method of determining the $M_1$ value as the number of bits having a pre-reliability value greater than a predetermined threshold. However, the method of determining a value of $M_1$ is not limited to these examples.

Examples of a method of calculating pre-reliability are a method of obtaining an absolute value of soft decision decoding information, such as $|L(b_k)|$, and a method of calculating pre-reliability $u_k$ using Equation 8. However, the method of calculating pre-reliability is not limited to the examples.

$$u_k = \frac{e^{|L(b_k)|}}{1 + e^{|L(b_k)|}} \qquad (8)$$

Here, the latter is used as the method of determining a value of $M_1$, and as an example, it will be described that the hard decision unit 156 calculates $\hat{b}_1^{(1)}$ and $\hat{b}_1^{(7)}$ when $|L(b_5)|>|L(b_1)|>|L(b_2)|>|L(b_4)|>$pre-reliability threshold$>|L(b_7)|>|L(b_6)|>|L(b_8)|>|L(b_3)|$. Since bits having pre-reliability greater than the pre-reliability threshold are $b_5$, $b_2$, and $b_4$ among the bits remaining by excluding $b_1$, hard decision of the bits $b_5$, $b_2$, and $b_4$ is performed using Equation 7, and as the hard decision result, the hard decision vector S10, i.e., $\hat{b}_1^{(1)}=[b_5\ b_2\ b_4]^T$ is calculated. Here, $M_1=3$.

As well, since bits having pre-reliability greater than the pre-reliability threshold are $b_5$, $b_1$, $b_2$, and $b_4$ among the bits remaining by excluding $b_7$, a hard decision of the bits $b_5$, $b_1$, $b_2$, and $b_4$ is performed using Equation 7, and as the hard decision result, the hard decision vector S10, i.e., $\hat{b}_1^{(7)}=[b_5\ b_1\ b_2\ b_4]^T$ is calculated. Here, $M_1=4$.

The reliability calculator 158 calculates $\phi(m)$, which is the reliability S12 of $b_m$, based on the hard decision vector S10 $\hat{b}_1^{(m)}$ and the estimated channel response matrix S8 $\tilde{A}$. In the current embodiment, $\phi(m)$ is calculated using Equation 9.

$$\varphi(m) = \min_{b_2}\left|y - \tilde{A}_1\hat{b}_1^{(m)} - \tilde{A}_2 b_2 + \tilde{a}_m\right|^2 - \min_{b_2}\left|y - \tilde{A}_1\hat{b}_1^{(m)} - \tilde{A}_2 b_2 - \tilde{a}_m\right|^2 \qquad (9)$$

Here, $\tilde{A}_1$ is a matrix made up of channel response values of bits belonging to the hard decision vector among elements of $\tilde{A}$, $\tilde{A}_2$ is a matrix made up of channel response values of bits remaining by excluding bits belonging to the hard decision vector and $b_m$ among the elements of $\tilde{A}$, and $\tilde{a}_m$ is a vector made up of channel response values of $b_m$, among the elements of $\tilde{A}$. In particular, $y - \tilde{A}_1\hat{b}_1^{(m)}$ is a signal obtained by canceling an interference component according to the hard decision vector from the received signal. Using the signal $y - \tilde{A}_1\hat{b}_1^{(m)}$, the reliability $\phi(m)$ can be obtained by considering only the remaining bits, i.e., the number of occasions of $b_2$, thereby reducing the computation amount.

When the detection is initially performed, i.e., when the detector 150 cannot obtain the soft decision decoding information S14 yet, examples of a method of calculating the reliability S12 are a method of multiplying a pseudo inverse matrix of $\tilde{A}$ by y and a method of using Equation 9 without the hard decision. However, the method of calculating the reliability S12 is not limited to these examples.

Figure 2:
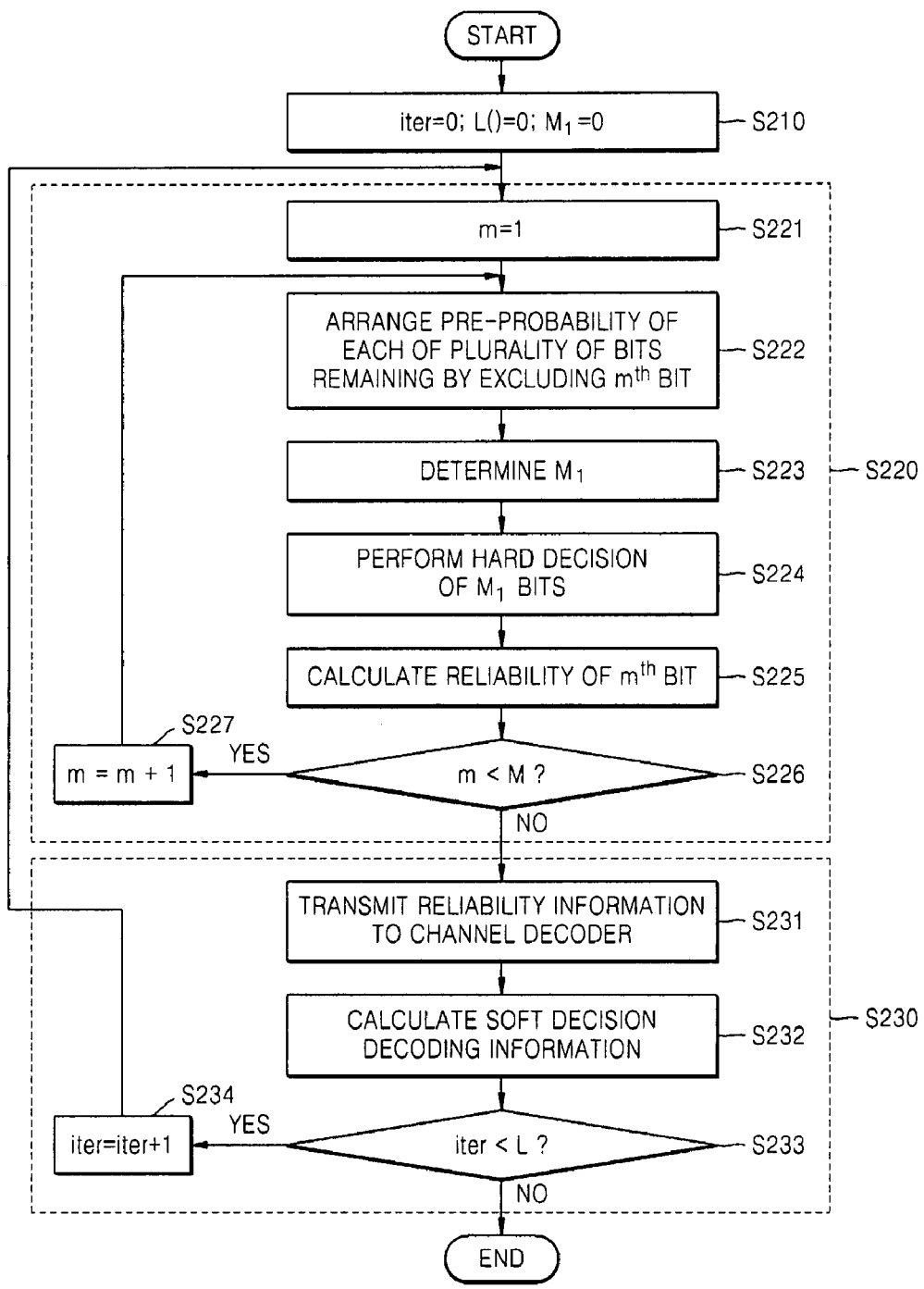
FIG. 2 is a flowchart illustrating an iteratively receiving method according to an embodiment of the present invention.

FIG. 2 is a flowchart illustrating an iteratively receiving method according to an embodiment of the present invention. Referring to FIG. 2, the iteratively receiving method includes operations processed sequentially by the iterative receiver illustrated in FIG. 1. Thus, even if omitted, the above-description of the iterative receiver illustrated in FIG. 1 is also applied to the iteratively receiving method according to the current embodiment.

In operation S210, parameters of an iteratively receiving algorithm are initialized. Here, iter denotes the number of iterations, and L( ) denotes pre-probability information of binary information.

Operation S220 is performed by the detector 150, and operation S230 is performed by components except the detector 150. FIG. 2 illustrates that operation S220 is performed by iterating operations S221 through S227 M times to calculate reliability of M bits. However, this is only one example and can be achieved in units of M bits that a single moment received signal y has.

In operation S221, m is initialized to 1. In operation S222, the hard decision unit 156 arranges bits remaining by excluding $b_m$, in the order of magnitude of pre-reliability based on $L(b_1), \ldots, L(b_M)$. For example, a bit arrangement method of Equation 10 can be used.

$$u_{m_1} \geq u_{m_2} \geq \ldots \geq u_{m_{M-1}}, m_i \in \{1, 2, \ldots, M\} \setminus \{m\} \qquad (10)$$

In Equation 10, $u_{m_1}$ may be obtained using Equation 11.

$$u_{m_l} \triangleq \max[Pr(u_{m_l}=1), 1 - Pr(u_{m_l}=1)] \qquad (11)$$

Here, $u_{m_l}$ has a value between 0.5 and 1 and has a value closer to 1 as the probability that $b_m$ is 1 or $-1$ is higher. That is, if $u_{m_l}$ has a value closer to 1, it can be determined that the pre-reliability is higher.

In operation S223, $M_1$ is determined. In operation S224, a hard decision of $M_1$ bits having high pre-reliability among the bits arranged in the order of magnitude of pre-reliability is performed. Then, a hard decision vector and a vector of bits remaining by excluding $b_m$ can be calculated using Equation 12.

$$b_1 = \begin{bmatrix} b_{m_1} & b_{m_2} & \cdots & b_{m_{M_1}} \end{bmatrix}^T, \qquad (12)$$
$$b_2 = \begin{bmatrix} b_{m_{M_1+1}} & b_{m_{M_1+2}} & \cdots & b_{m_{M-1}} \end{bmatrix}^T$$

By approximating a received signal in the binary domain using the hard decision vector, the received signal y can be presented as $y \approx A_1\hat{b}_1 + A_2 b_2 + a_m + n$. Here, $A_1$, $A_2$, and $a_m$ are channel matrices corresponding to $b_1$ and $b_2$ and a channel vector corresponding to $b_m$, respectively. A vector $b_2$, having low pre-reliability may be estimated using Equation 13.

$$\tilde{b}(b_m) = \arg\min_{b_2}\left|y - A_1\hat{b}_1 - A_2 b_2 - \tilde{a}_m b_m\right|^2 \qquad (13)$$

Here, a solution of Equation 13 can be obtained using the linear filtering method, the interference cancellation method, or the maximum likelihood method described above.

In operation S225, reliability of an $m^{th}$ bit is calculated from the received signal from which the hard decision bit component is cancelled, using Equation 9.

In operation S226, it is determined whether in m smaller than M. If m is smaller than M, in operation S227, m is increased by 1, and then the process goes back to S222. If m is equal to M, the process goes to S231.

In operation S231, reliability values calculated by the detector 150 are transmitted to the channel decoder 190 via the deinterleaver 170.

In operation S232, the channel decoder 190 calculates soft decision decoding information based on the received reliability values.

In operation S233, it is determined whether the number of iterations iter is smaller than L. If the number of iterations iter is smaller than L, in operation S234, the iter value is increased by 1, and this process goes back to S221. In this case, the soft decision decoding information is transmitted to the detector 150 via the interleaver 180.

If the number of iterations iter is equal to L, the iteratively receiving process is terminated.

Figure 3A:
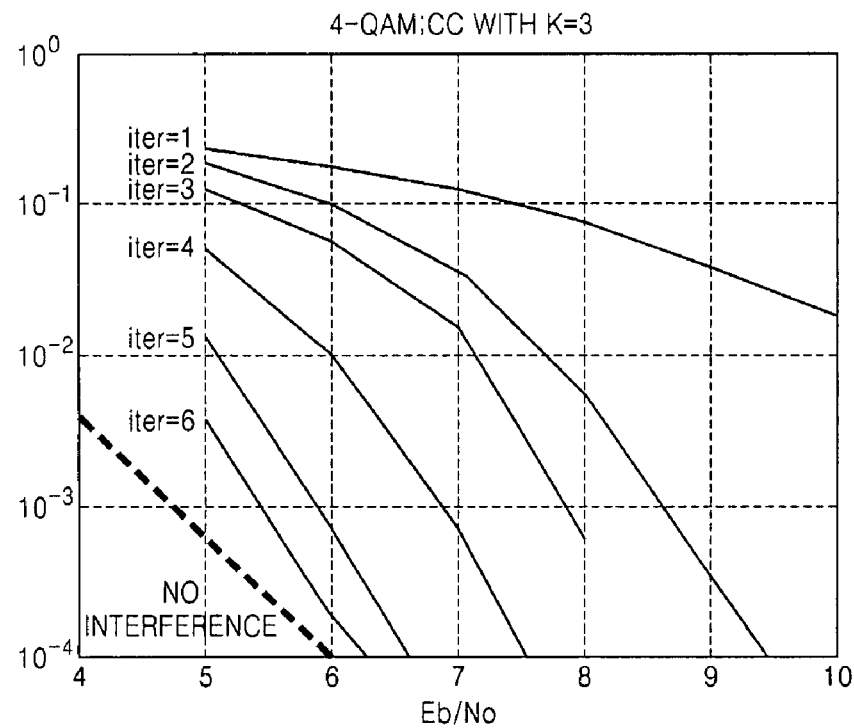
FIGS. 3A and 3B are diagrams showing the performance of an iterative receiver according to an embodiment of the present invention.
Figure 3B:
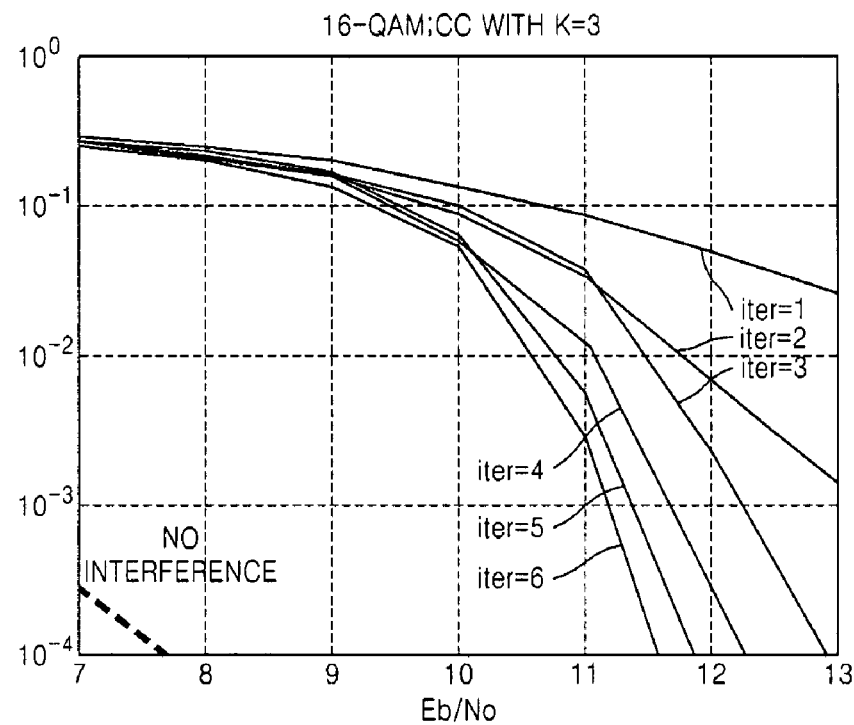

FIGS. 3A and 3B are diagrams showing the performance of an iterative receiver according to an embodiment of the present invention when a convolution code whose strain length is 3 is applied. FIG. 3A is an illustration of when a 4-QAM method is used, and FIG. 3B is an illustration of when a 16-QAM method is used Referring to FIGS. 3A and 3B, the greater the number of iterations, the better the performance. In addition, excellent performance can be obtained with a relatively small amount of computation.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to the present invention, excellent performance can be obtained with a relatively small amount of computation by selectively performing a hard decision and a soft decision in a binary domain in a single antenna or multi-antenna wireless communication system. In addition, the computation amount can be reduced by performing interference cancellation, and since the interference cancellation is performed in a bit unit, interference can be cancelled more precisely than using a symbol unit interference cancellation method.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A: detector for a multi-level modulated signal, the detector comprising:
   a channel estimator estimating a channel response of each of a plurality of bits included in at least one received signal based on multi-level modulation;
   a hard decision unit, for each bit, selecting at least one of the plurality of bits remaining by excluding the bit and performing a hard decision based on a pre-probability of the selected bit; and
   a reliability calculator calculating reliability of each of all the bits in the received signal based on the received signal from which a hard-decided bit component is cancelled and the estimated channel response.

2. The detector of claim 1, wherein the reliability calculator calculates the reliability using the equation $$\varphi(m) = \min_{b_2}\left|y - \tilde{A}_1 \hat{b}_1^{(m)} - \tilde{A}_2 b_2 + \tilde{a}_m\right|^2 - \min_{b_2}\left|y - \tilde{A}_1 \hat{b}_1^{(m)} - \tilde{A}_2 b_2 - \tilde{a}_m\right|^2,$$

where $\hat{b}_1^{(m)}$ denotes a vector composed of hard-decided bits to calculate $\phi(m)$, which is reliability of an $m^{th}$ bit, $b_2$ denotes a vector composed of bits remaining by excluding the hard-decided bits and the $m^{th}$ bit, $\tilde{A}_1$ and $\tilde{A}_2$ denote matrices made up of the estimated channel response values of bits belonging to $\hat{b}_1^{(m)}$ and $b_2$, respectively, $\tilde{a}_m$ denotes a vector made up of the estimated channel response value of the $m^{th}$ bit, and y denotes a vector made up of received signals.

3. The detector of claim 1, wherein the hard decision unit selects a predetermined number of bits having high reliability among the remaining bits using the pre-probability information.

4. An iterative receiver for a multi-level modulated signal, the iterative receiver comprising:
   a channel estimator estimating a channel response of each of a plurality of bits included in at least one received signal based on multi-level modulation;
   a hard decision unit, for each bit, selecting at least one of the plurality of bits remaining by excluding the bit and performing a hard decision based on a pre-probability of the selected bit;
   a reliability calculator calculating reliability of each of all the bits in the received signal based on the received signal from which a hard-decided bit component is cancelled and the estimated channel response; and
   a channel decoder performing channel decoding based on the calculated reliability and generating soft decision information of each of the bits,
   wherein the hard decision unit uses the soft decision information as information on the pre-probability.

5. The iterative receiver of claim 4, wherein the hard decision unit, the reliability calculator, and the channel decoder iteratively perform their jobs a predetermined number of times.

6. The iterative receiver of claim 4, further comprising:
   a deinterleaver deinterleaving the calculated reliability and providing the deinterleaved reliability to the channel decoder; and
   an interleaver interleaving the generated soft decision information and providing the interleaved soft decision information to the hard decision unit.

7. A detection method for a multi-level modulated signal, the detection method comprising:
   estimating a channel response of each of a plurality of bits included in at least one received signal based on multi-level modulation;
   for each bit, selecting at least one of the plurality of bits remaining by excluding the bit and performing a hard decision based on a pre-probability of the selected bit; and
   calculating reliability of each of all the bits in the received signal based on the received signal from which a hard-decided bit component is cancelled and the estimated channel response.

8. The detection method of claim 7, wherein, in the calculating, the reliability is calculated using the equation $$\varphi(m) = \min_{b_2}\left|y - \tilde{A}_1 \hat{b}_1^{(m)} - \tilde{A}_2 b_2 + \tilde{a}_m\right|^2 - \min_{b_2}\left|y - \tilde{A}_1 \hat{b}_1^{(m)} - \tilde{A}_2 b_2 - \tilde{a}_m\right|^2,$$

where $\hat{b}_1^{(m)}$ denotes a vector composed of hard-decided bits to calculate $\phi(m)$, which is reliability of an $m^{th}$ bit, $b_2$ denotes a vector composed of bits remaining by excluding the hard-decided bits and the $m^{th}$ bit, $\tilde{A}_1$ and $\tilde{A}_2$ denote matrices made up of the estimated channel response values of bits belonging to $\hat{b}_1^{(m)}$ and $b_2$, respectively, $\tilde{a}_m$ denotes a vector made up of the estimated channel response value of the $M^{th}$ bit, and y denotes a vector made up of received signals.

9. The detection method of claim 7, wherein the selecting comprises selecting a predetermined number of bits having high reliability among the remaining bits using the pre-probability information.

10. An iteratively receiving method for a multi-level modulated signal, the iteratively receiving method comprising:
  estimating a channel response of each of a plurality of bits included in at least one received signal based on multi-level modulation;
  for each bit, selecting at least one of the plurality of bits remaining by excluding the bit and performing a hard decision based on a pre-probability of the selected bit;
  calculating reliability of each of all the bits in the received signal based on the received signal from which a hard-decided bit component is cancelled and the estimated channel response; and
  performing channel decoding based on the calculated reliability and generating soft decision information of each of the bits,
  wherein in the selecting, the soft decision information is used as information on the pre-probability.

11. The iteratively receiving method of claim 10, wherein operations the selecting through the performing are iteratively performed a predetermined number of times.

12. The iteratively receiving method of claim 10, further comprising:
  deinterleaving the calculated reliability; and
  interleaving the generated soft decision information,
  wherein the performing comprises performing channel decoding based on the deinterleaved reliability, and
  the selecting comprises performing a hard decision based on the interleaved soft decision information.

13. A non-transitory computer readable recording medium storing a computer readable program for executing the method of claim 7.

* * * * *